No. 677,495. Patented July 2, 1901.
J. A. BILZ.
VINEYARD PLOW.
(Application filed May 6, 1901.)

(No Model.)

Witnesses,

Inventor,
John A. Bilz

UNITED STATES PATENT OFFICE.

JOHN A. BILZ, OF PLEASANTON, CALIFORNIA.

VINEYARD-PLOW.

SPECIFICATION forming part of Letters Patent No. 677,495, dated July 2, 1901.

Application filed May 6, 1901. Serial No. 58,837. (No model.)

*To all whom it may concern:*

Be it known that I, JOHN A. BILZ, a citizen of the United States, residing at Pleasanton, county of Alameda, State of California, have invented an Improvement in Vineyard-Plows; and I hereby declare the following to be a full, clear, and exact description of the same.

My invention relates to improvements in plows, and is especially applicable to a class of gang-plows which are designed to work between regularly-spaced rows of vines, trees, or other products which are planted at regularly-spaced intervals.

My invention consists in a novel construction and arrangement of the plow-frames, the standard-bearing sockets, journal-boxes of the wheel-axles, and adjusting lever mechanism whereby the location of these parts may all be shifted in a single apparatus, so that the plows may first be used to throw the earth away from the rows and afterward adjusted for the second plowing to throw the dirt toward the rows, or vice versa.

My invention also comprises details of construction, which will be more fully explained by reference to the accompanying drawings, in which—

Figure 1:
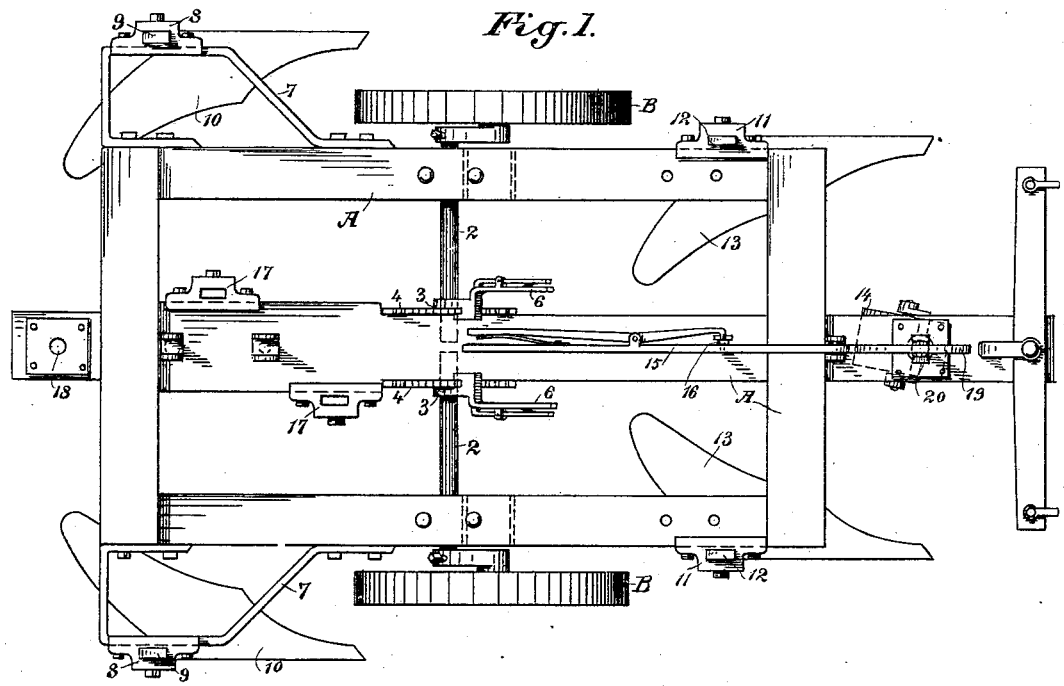
Figure 2:
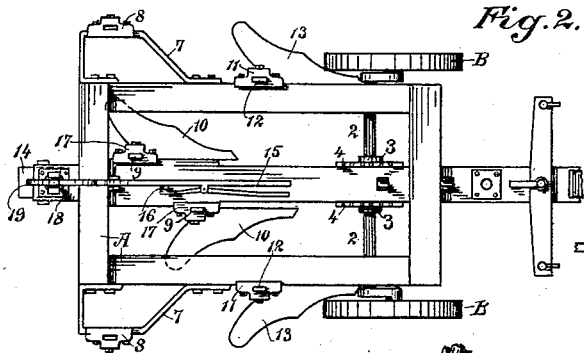
Figure 3:
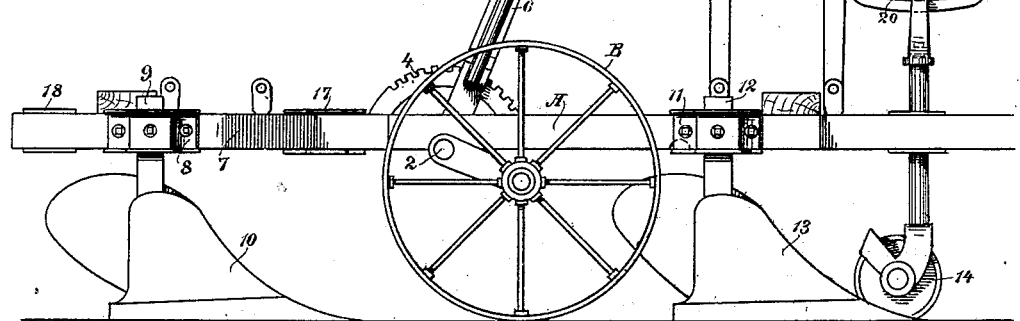

Figure 1 is a plan view of the plow, showing it so arranged as to throw the soil inwardly. Fig. 2 shows it in condition to throw the soil outwardly. Fig. 3 is a side elevation of Fig. 1.

In the cultivation of vineyards and the like the vines or other plants or trees are set in rows a certain distance apart, and when the weeds and grass have sprung up between the rows it is necessary to plow the ground to turn the weeds and grass out and give them an opportunity to die and become rotten, after which the earth is again turned back around the vines to retain the necessary moisture required later in the season. In order to accomplish this object with a single apparatus, I employ a frame A, mounted upon bearing-wheels B, having independent crank-axles 2, each axle extending from its wheel through a journal-box fixed to the frame and having the inner end journaled in boxes, as 3, which are formed or carried with segmental racks 4, which racks serve for the engagement of pawls carried by the lever 6, by which the crank-axles of the wheels are turned, so as to raise or lower the plows and regulate the depth to which they cut.

Upon the rear and outside angles of the frame A are fixed brackets 7, which extend outwardly and have bolted to their outer faces the boxes or supports 8, within which the vertical standards 9 of the rearmost plows 10 may be secured when these plows are so adjusted that the moldboards will throw the earth away from the rows and toward the center, as shown in Fig. 1. Upon the forward portion of the frame A are other standard boxes or sockets 11, within which the standards 12 of the forward plows 13 are fixed. These plows 13 being closer together than the plows 10 and the two sets of plows following each other and acting in unison serve to thoroughly loosen up the soil between the rows of vines and throw it and the weeds, grass, &c., toward the center, thus leaving the vines clear after this cultivation. When thus arranged to throw the soil toward the center, the front of the frame A is supported upon a centrally-located bearing-wheel 14, the standard of which extends upwardly through a socket fixed for the purpose and is connected with a lever 15, by which the wheel may be moved so as to raise or lower the front of the frame A and assist in regulating the depth to which the plows will cut. By means of a suitable standard 16, having holes therethrough, and a pin passed through a corresponding hole in the lever and the standard the adjustment can be readily made.

The locking-pin is actuated by a spring-pressed lever fixed to the handle 15.

The boxes of the main bearing-wheels are bolted to the frame A at points intermediate between the front and rear plows 13 and 10, and the levers 6, by which the crank-shafts are turned to raise or lower the frame and regulate it to the depth or cut of the plows, are also fulcrumed with the segmental racks which carry the inner boxes 3, so that all these parts are located as shown in Fig. 1. Suitable holes or attachments are made in the frame to allow these changes to be readily made.

After the first plowing has been completed the land remains in this condition for about a month, more or less, and then it is necessary to replow and to again throw the soil toward the vines, the weeds having by this time been destroyed. For this purpose the various parts of the machine are changed, as shown in Fig. 2. In this form the standards 9 of the rear plows are removed from the socket-supports 8 and the plows 10 are reversed—that is, the plow upon the left side is moved over to the right side of the central portion of the frame A and the plow upon the right side is moved to the left side of the center. The standards 9 of these plows are fixed in supporting boxes or sockets 17, which are fixed to the central portion of the frame, as shown. This brings the plows 10 closely together in the rear part of the frame. The plows 13 are in like manner changed to opposite sides of the frame, and the boxes 11, in which their standards 12 are secured, are moved backward to points on the outside of the frame A, as shown in Fig. 2. The boxes of the crank-shafts 2 of the bearing-wheels are also removed and carried forward to the front of the frame, the boxes 3 and segment-racks 4 being moved into alinement with the other wheel-shaft boxes, the parts then standing with relation to each other as shown in Fig. 2. The bearing-wheel 14 is removed from the front socket and is transferred to a socket 18 at the rear of the center of the frame A, so that the plows when arranged for throwing the soil outwardly are located between the bearing-wheels B and 14. This necessitates a change in the position of all the levers. The levers 6 are moved with the movement of the segmental racks 4 and stand at the front of the frame. The lever 15 and the standard 16 are also transferred to the rear portion of the frame, and the lever then connects with the standard of the wheel 14, so as to raise or lower it. This connection is made by means of a link 19, which projects from the lever 15 near its fulcrum-point, and a roller 20, carried by the head of the standard of the wheel 14, is adapted to travel in the slot of the link 19, so that while the lever moves in an angular direction with relation to the vertical movement of the standard the latter is allowed to move vertically without any undue friction between the parts.

By this construction and the means for transferring the plow-standard supports, wheel-axle boxes, and the operating-levers I am enabled to arrange the single apparatus so that it is available for the two kinds of work necessary in the vineyard and a very considerable expense is avoided.

Having thus described my invention, what I claim as new, and desire to secure by Letters Patent, is—

1. The combination in a plow of a main frame, main bearing-wheels, having independent crank-axles with journal-boxes, operating-levers and segmental holding-racks, a supplemental centrally-located bearing-wheel with standard and operating-lever, boxes for the support of said standard and of the main wheel-axles, and means whereby said boxes may be shifted upon the frame and the relative position of the bearing-wheels changed.

2. The combination in a plow of a plow-frame, plows having standards, sockets fixed to the frame adapted to receive said standards, main and supplemental bearing-wheels and operating-levers, means whereby the standard-sockets and the wheel-boxes and supports may be changed and the relative position of the plows reversed.

3. The combination in a plow of a main frame, main and supplemental bearing-wheels with operating-levers, brackets fixed upon the outer rear angles of the main frame having plow-standard sockets carried upon their outer sides, other plow-standard sockets adjustably carried upon the front of the frame and in lines interior to those of the rearmost plows whereby said plows may be adjusted to travel in different lines and to throw the earth toward the center.

4. The combination in a plow of a main frame, brackets fixed upon the outer rear angles having vertical plow-standard sockets carried upon their outer faces whereby the rearmost plows may be set exterior to the main frame to throw the earth inwardly, other vertical plow-standard sockets adjustably fixed upon the front of the main frame in lines interior to the rearmost sockets whereby the front plows are set on lines of travel interior to those of the rear plows to throw the dirt inwardly, main bearing-wheels having independent crank-axles, journal-boxes in which said axles are turnable, said boxes being adjustably fixed between the front and rearmost plows, a supplemental bearing-wheel, a socket within which the vertical standard of said wheel is slidable at the rear of the main frame, and levers by which each of the wheels may be independently adjusted.

5. The combination in a plow of a main frame having plow-standard sockets fixed thereto in which the plows may be supported to throw the earth either outwardly or inwardly, a supplemental bearing-wheel having a vertical standard, sockets in the front and rear of the main frame in either of which said standard may be carried and a reversible operating-lever therefor fulcrumed to the main frame, main bearing-wheels having independent crank-axles, exterior boxes adjustably fixed to the main frame and interior boxes and segmental racks fixed to the central portion of the frame and levers fulcrumed thereto by which said bearing-wheels may be independently adjusted to regulate the depth of the plows.

6. The combination in a plow of a main frame and plow-standard sockets carried thereby, main bearing-wheels having independent crank-axles, boxes fixed to the outer sides of the main frame in which said axles are turnable, boxes fixed upon the central portion of the frame in which the inner ends of said shafts are turnable, said interior boxes carrying segmental racks, and levers fulcrumed and turnable to independently adjust the wheels and pawls by which said levers are engaged with the racks at any point of adjustment and a supplemental independently-adjustable bearing-wheel having a standard and sockets upon the front and rear of the main frame in which said standard may be supported.

In witness whereof I have hereunto set my hand.

JOHN A. BILZ.

Witnesses:
P. C. QUINN,
F. SNAREY.